(12) United States Patent
Zhang et al.

(10) Patent No.: US 8,621,659 B2
(45) Date of Patent: Dec. 31, 2013

(54) CANTILEVER FOR MAGNETIC FORCE MICROSCOPE AND METHOD OF MANUFACTURING THE SAME

(75) Inventors: Kaifeng Zhang, Yokohama (JP); Takenori Hirose, Tokyo (JP); Masahiro Watanabe, Yokohama (JP); Tetsuya Matsui, Hitachi (JP); Tsuneo Nakagomi, Nakai (JP); Teruaki Tokutomi, Odawara (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/462,845

(22) Filed: May 3, 2012

(65) Prior Publication Data
US 2012/0291161 A1 Nov. 15, 2012

(30) Foreign Application Priority Data

May 9, 2011 (JP) .................................. 2011-104151

(51) Int. Cl.
G01Q 60/36 (2010.01)
G01Q 60/42 (2010.01)
G01Q 60/54 (2010.01)
G01Q 70/16 (2010.01)

(52) U.S. Cl.
CPC .............. *G01Q 60/36* (2013.01); *G01Q 60/42* (2013.01); *G01Q 60/54* (2013.01); *G01Q 70/16* (2013.01)
USPC ...................... 850/56; 850/6; 850/47; 850/59

(58) Field of Classification Search
CPC ....... G01Q 60/38; G01Q 60/42; G01Q 60/50; G01Q 60/54; G01Q 70/12; G01Q 70/14; G01Q 70/16; G01Q 70/18
See application file for complete search history.

(56) References Cited

U.S. PATENT DOCUMENTS

| 5,892,223 | A  | * | 4/1999  | Karpov et al. ................. 850/59 |
| 5,968,677 | A  | * | 10/1999 | Watanabe et al. ......... 428/811.4 |
| 6,081,113 | A  | * | 6/2000  | Tomita et al. ................. 324/210 |
| 7,495,215 | B2 | * | 2/2009  | Akinaga et al. ............... 250/306 |
| 7,637,149 | B2 | * | 12/2009 | Degertekin et al. ............. 73/105 |
| 8,020,216 | B2 | * | 9/2011  | Jin ................................. 850/60 |
| 8,185,968 | B2 | * | 5/2012  | Nakagomi et al. ............. 850/46 |
| 8,245,318 | B2 | * | 8/2012  | Jin et al. ........................ 850/58 |
| 2007/0012094 | A1 | * | 1/2007  | Degertekin et al. ............. 73/105 |
| 2008/0098805 | A1 | * | 5/2008  | Jin et al. ........................ 73/105 |
| 2010/0205699 | A1 | * | 8/2010  | Tachizaki et al. .............. 850/47 |
| 2012/0054924 | A1 | * | 3/2012  | Zhang et al. ..................... 850/6 |
| 2012/0291161 | A1 | * | 11/2012 | Zhang et al. ................... 850/56 |
| 2013/0097739 | A1 | * | 4/2013  | Zhang et al. ..................... 850/6 |

FOREIGN PATENT DOCUMENTS

| JP | 8-21870    | 1/1996 |
| JP | 9-152474   | 6/1997 |
| JP | 2003-215020| 7/2003 |

* cited by examiner

*Primary Examiner* — David A Vanore
(74) *Attorney, Agent, or Firm* — Antonelli, Terry, Stout & Kraus, LLP.

(57) ABSTRACT

In a method of manufacturing this cantilever for the magnetic force microscope, a magnetic film is formed on a probe at a tip of the cantilever for the magnetic force microscope. When a non-magnetic rigid protective film is formed around the probe, the film is formed from the front of the probe of the cantilever for the magnetic force microscope at an angle (15° to 45°) and from the back of the probe of the cantilever for the magnetic force microscope in two directions each at an angle in a range of (15° to 30°).

11 Claims, 8 Drawing Sheets

STRAIGHT IN FRONT

OBLIQUELY BELOW

BOTTOM

NORMAL (WITHOUT FOREIGN SUBSTANCE)

NORMAL (WITH FOREIGN SUBSTANCE)

CANTILEVER FOR MAGNETIC FORCE MICROSCOPE AND METHOD OF MANUFACTURING THE SAME

CROSS-REFERENCE TO RELATED APPLICATION

The present application claims priority from Japanese Patent Application No. 2011-104151 filed on May 9, 2011, the content of which is hereby incorporated by reference into this application.

TECHNICAL FIELD OF THE INVENTION

The present invention relates to cantilevers for magnetic force microscopes and, in particular, to protection of a tip of a cantilever.

BACKGROUND OF THE INVENTION

In an atomic force microscope (AFM), a cantilever mounted with a sharp-tipped probe is used and the probe runs over a sample surface or traces with keeping a predetermined space from the sample surface in order to measure a displacement of the cantilever in a vertical direction due to an interatomic force between the sample and the probe, thereby evaluating the surface shape of the sample.

Here, an example of structure of an atomic force microscope (AFM) is specifically described. FIG. 6 is an explanatory diagram for describing the example of structure of the atomic force microscope.

In FIG. 6, the most basic structure of the atomic force microscope (AFM) is that a measuring part of the atomic force microscope (AFM) is placed above a vibration isolation table 101.

First, a cantilever 1 having a fine probe at its tip is vibrated by a vibrating part 102. Next, by using an optical microscope 103, the cantilever 1 is moved to a point above a place to be observed. Here, a Z stage 104 is gradually raised so as to bring the cantilever 1 closer to a sample 108 placed on a sample table 107.

When the cantilever 1 comes sufficiently close to the sample 108, an interatomic force (an attractive force or a repulsive force) acting between the probe at the tip of the cantilever 1 and the sample surface influences vibrations of the cantilever 1. When a distance between the probe and the sample is a predetermined distance (when they are at a standard position), the force influencing vibrations of the cantilever 1 is constant, and a deflection of the vibrating cantilever 1 is also constant.

Here, the atomic force microscope (AFM) detects from a deflection of the cantilever 1, and a reflection spot of a light beam from a laser 109 to irradiate the tip of the cantilever 1 is detected by a position detector 110. This optical detection system uses an "optical lever method", and a subtle displacement of the cantilever 1 is magnified and projected onto the position detector 110. As the position detector 110, for example, a quadrant photodiode as shown in FIG. 6 is used. By computing a difference between respective detection signal amounts by a computation circuit, positional information is obtained.

That is, when the tip of the cantilever 1 is vertically displaced to cause a shift of the position of the reflection spot, a change occurs in the computation result of the difference between the detection signal amounts. Upon reception of this result, a differential amplifier 111 sends, to a power supply for driving piezoelectric element (on the Z stage 104), an output capable of feedback control over the distance between the probe and the sample so as to minimize a difference from a reference position, that is, to make the deflection amount of the cantilever constant.

A feedback circuit 112, for example, when the cantilever 1 is displaced upward, makes piezoelectric elements on the Z stage 104 shrink to cause the posture of the cantilever back to the original position.

In this manner, the atomic force microscope (AFM) scans the tested surface under feedback control that keeps the interatomic force acting between the probe and the sample constant, and, based on data obtained by distance-conversion of a Z-stage driving voltage at this time, an instruction is issued from a same computer 113 to an XY driving circuit 114 for moving the sample in X and Y directions to control an X stage 105 and a Y stage 106. In this manner, imaging is performed on the computer 113 as three-dimensional asperity information.

The spatial resolution of the atomic force microscope (AFM) depends on the radius of curvature of the probe at the tip of the cantilever 1, and the resolution is generally on the order of several nanometers.

According to what is called a magnetic force microscope (MFM), based on the atomic force microscope (AFM) inspection technology, the cantilever 1 being vapor-deposited with a magnetic material is used and is lifted up to a predetermined height from the surface of an object to be measured to measure a magnetic field occurring from the material surface above the object to be measured (about 10 to 30 nm thereabove).

An example of structure of this magnetic force microscope is shown in FIG. 7. FIG. 7 is an explanatory diagram for describing the example of structure of the magnetic force microscope (MFM).

In FIG. 7, a difference from the atomic force microscope (AFM) shown in FIG. 6 is that the cantilever 1 is lifted up to a predetermined height from the surface of an object to be measured to measure a magnetic field generated from the material surface above the object to be measured and also that the probe at the tip of the cantilever 1 is a magnetic-material-provided probe.

In general, it has been revealed by an experiment that, as with the atomic force microscope (AFM), the detectable spatial resolution of the magnetic field depends on the radius of curvature of the probe and others and, in practice, relates directly to the shape of the magnetic substance to be provided to the probe.

Here, an influence of a foreign substance when the magnetic force microscope (MFM) is used for measurement is described with reference to FIG. 8. FIG. 8 is an explanatory diagram for describing the influence of the foreign substance when the magnetic force microscope (MFM) is used for measurement.

A cantilever 1 of the magnetic force microscope (MFM) is at a predetermined height above the sample 108 to scan the sample 108. Therefore, as shown in FIG. 8, if a foreign substance 303 is present on the surface of the object to be measured from which a magnetic field to be measured 302 occurs, there is a high possibility that the probe is broken when the foreign substance collides with the probe at the tip of the cantilever 1 during high-speed scanning.

For this magnetic field microscope (MFM), a technology of providing a functional film such as a magnetic film on the probe at the tip of the cantilever is disclosed in, for example, Japanese Patent Application Laid-Open Publication No. 2003-215020 (Patent Document 1).

SUMMARY OF THE INVENTION

In many of magnetic force microscopes (MFM) at present, on each measurement line on the surface of an object to be measurement, height information is first collected in AFM mode, and then the cantilever 1 is lifted up to a predetermined height above the object to be measured to scan in MFM mode.

In this case, for scanning in AFM mode, it is difficult to cut the measurement time. In order to achieve a high-speed MFM, on the premise that the object to be measured has a uniform height to its surface, only a measurement to get height information of the first one line or several lines is performed. Then, high-speed scanning in MFM mode is performed continuously ever after.

Here, if a foreign substance is present in an area where its height information is not obtained yet, there is an extremely high possibility that the probe at the tip of the cantilever during high-speed scanning collides with the foreign substance and is broken. Minimizing the possibility of breakage of the probe when the probe collides with a foreign substance has been a problem.

Moreover, since the magnetic film to be provided to the probe at the tip of the cantilever 1 for the magnetic force microscope is generally made of a material that is prone to oxidation. Therefore, as the magnetic material of the probe is oxidized with time, the volume of the probe and magnetic characteristics are disadvantageously changed.

For example, since Japanese Patent Application Laid-Open Publication No. 2003-215020 mentioned above does not disclose addition of a protective film to the probe specially manufactured finely, the magnetic material of this probe may be oxidized.

Furthermore, when the cantilever 1 for the magnetic force microscope is manufactured, the performance of the cantilever 1 for the magnetic force microscope is significantly changed depending on how to attach a magnetic film and a protective film. For example, the thickness of the magnetic film and the place where the film is present influence the spatial resolution for measurement. Also, if there is no distinction in the thickness of the protective film between a tip part of the probe and other parts thereof, there is a high possibility that the cantilever 1 does not work as the one for the magnetic force microscope. That is, if the thickness of the protective film at the tip part is too thick, the distance between the magnetic substance attached to the probe and the magnetic field to be measured is long, thereby making it difficult to sense the magnetic field. Therefore, how to manufacture the cantilever 1 for the magnetic force microscope is also a problem.

In order to solve the problems described above, the present invention provides manufacturing of a cantilever for a magnetic force microscope with high durability by using the fact that the spatial resolution of the cantilever 1 for the magnetic force microscope depends only on the shape of the magnetic substance provided to the tip of the probe of the cantilever 1 for the magnetic force microscope and further forming a protective film outside the probe provided with a magnetic film.

These and other preferred aims and novel characteristics of the present invention will be apparent from the description of the present specification and the accompanying drawings.

The typical ones of the inventions disclosed in the present application will be briefly described as follows.

That is, in the typical aspect, a magnetic film is formed at a tip of the cantilever for the magnetic force microscope, and then a non-magnetic rigid film is provided around the probe of the cantilever for the magnetic force microscope.

The effects obtained by typical aspects of the present invention will be briefly described below.

That is, an effect to be achieved by the typical aspect is such that high rigidity, resistance to collision, and resistance to wear can be achieved to ensure the spatial resolution of the cantilever for the magnetic force microscope and the magnetic film, which is prone to be oxidized, can be protected.

These and other objects, features and advantages of the invention will be apparent from the following more particular description of preferred embodiments of the invention, as illustrated in the accompanying drawings.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols in principle throughout the drawings for describing the embodiment, and the repetitive description thereof will be omitted.

(First Embodiment)

Figure 1:
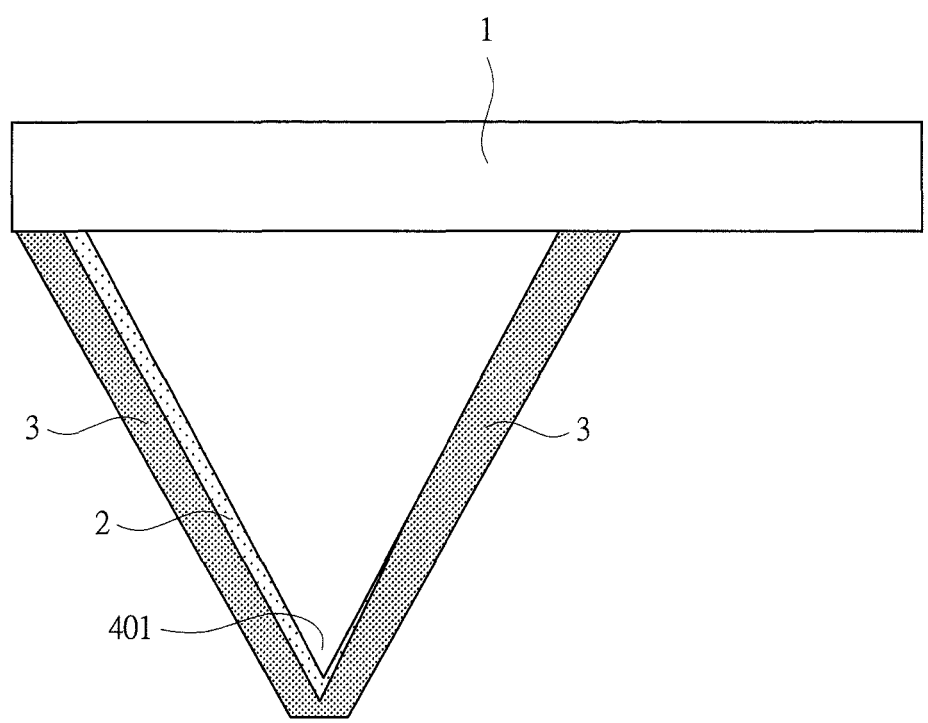
FIG. 1 is a structural diagram showing structure of a cantilever for a magnetic force microscope according to a first embodiment of the present invention.

The structure of a cantilever for a magnetic force microscope according to a first embodiment of the present invention is described based on FIG. 1. FIG. 1 is a structural diagram showing the structure of the cantilever for the magnetic force microscope according to the first embodiment of the present invention.

In FIG. 1, a cantilever 1 for a magnetic force microscope has a probe 401 with a tetrahedral structure, and includes a magnetic film 2 provided at the front of the probe 401 and a non-magnetic rigid protective film 3 provided at the front and back of the probe 401 provided with the magnetic film 2. In this manner, the cantilever 1 for the magnetic force microscope with high durability is configured.

Each part of the cantilever 1 for the magnetic force microscope in the present embodiment functions as follows.

The cantilever 1 for the magnetic force microscope is similar to the one in a general atomic force microscope. However, the magnetic film 2 attached to the probe 401 at the tip of the cantilever 1 for the magnetic force microscope determines the spatial resolution of the cantilever 1 for the magnetic force microscope, and a magnetic field of an object to be measured is sensed at the time of measurement by the magnetic force microscope.

Since the non-magnetic rigid protective film 3 is formed so as to be rigid and thick (on the order of several tens of nanometers to 300 nm), the rigidity of the probe 401 is improved to suppress the possibility of breakage when the probe collides with a foreign substance during high-speed scanning. Also, since the magnetic film 2 is generally formed of a material that is prone to oxidation, it is possible to prevent oxidation of the magnetic material.

Figure 2A:
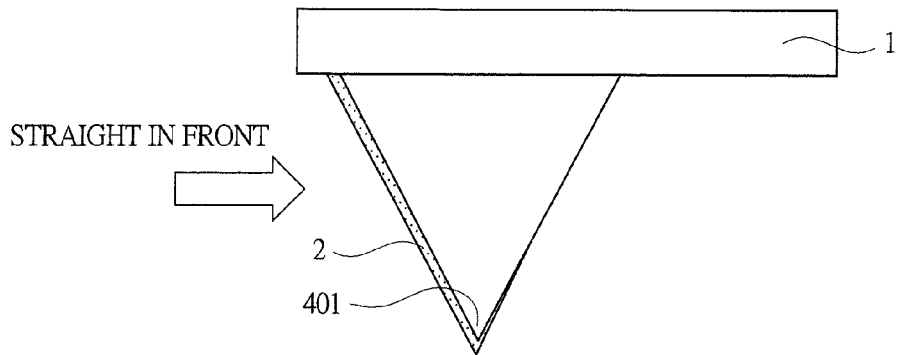
FIG. 2A is a diagram showing a method of manufacturing the cantilever for the magnetic force microscope according to the first embodiment of the present invention.
Figure 2B:
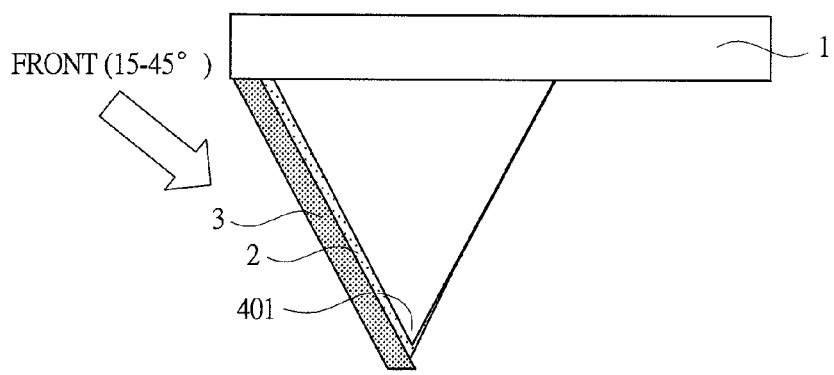
FIG. 2B is a diagram showing the method of manufacturing the cantilever for the magnetic force microscope according to the first embodiment of the present invention.
Figure 2C:
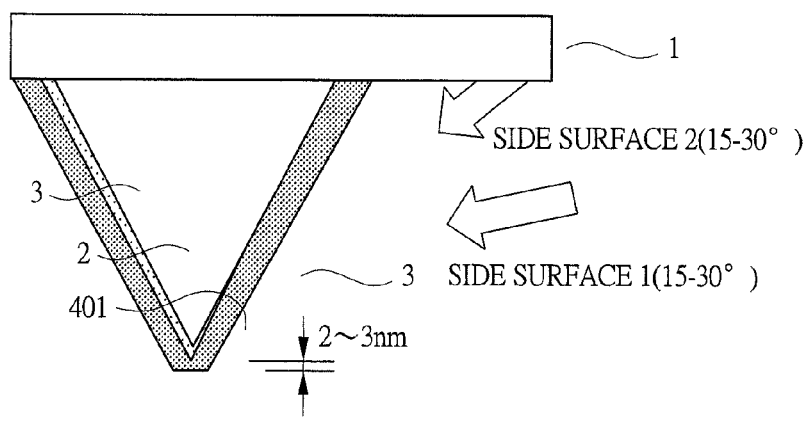
FIG. 2C is a diagram showing the method of manufacturing the cantilever for the magnetic force microscope according to the first embodiment of the present invention.

Next, a method of manufacturing the cantilever for the magnetic force microscope according to the first embodiment of the present invention is described with reference to FIGS. 2A to 2C. FIGS. 2A to 2C are diagrams showing the method of manufacturing the cantilever for the magnetic force microscope according to the first embodiment of the present invention.

First, coating with the magnetic film 2 is performed from straight in front of the cantilever 1 for the magnetic force microscope having the probe 401 having a tetrahedral structure (FIG. 2A). The amount of formation of the magnetic film is determined based on the strength and size of the magnetic field of an actual object to be measured, and is generally 5 to 40 nm. As the material of the magnetic substance, a soft magnetic material such as Ni (nickel), NiFe (nickel iron), or CoFe (cobalt iron) can be selected and also a rigid magnetic material such as Co (cobalt), Al—Ni—Co (aluminum-nickel-cobalt), or Fe—Pt (iron-platinum) can be selected, according to the measurement purpose.

Furthermore, the non-magnetic rigid protective film 3 is provided at a tip projecting part of the cantilever 1 for the magnetic force microscope. The non-magnetic rigid protective film 3 is first provided from the front of the cantilever 1 for the magnetic force microscope. In order to suppress the amount of turning around (wraparound) of the tip of the probe, the film is formed at an angle (15° to 45°) (FIG. 2B).

Subsequently, a film is formed on the back of the projecting part. However, since a lever part of the cantilever 1 for the magnetic force microscope is present, it is impossible to form a film in the same manner as that of the front. Therefore, as shown in FIG. 2C, a film is formed obliquely from the back in two directions at an angle (15° to 30°). A maximum film thickness of the non-magnetic rigid protective film 3 is on the order of 300 nm.

However, it is required to suppress the thickness of the non-magnetic rigid protective film 3 at the tip part of the probe to 2 to 3 nm. A material of the non-magnetic rigid protective film 3 is a rigid non-magnetic material such as DLC (diamond-like carbon), TiN (titanium nitride), TiC (titanium carbide), TiCN (titanium carbonitride), CrNCN (chrome nitride carbonitride), a noble metal, or others. However, to prevent oxidation of the magnetic film, a magnetic metal material such as Ni may be used.

By manufacturing the cantilever 1 for the magnetic force microscope in this manner, the cantilever 1 for the magnetic force microscope provided with the non-magnetic rigid protective film 3 can be easily manufactured.

(Second Embodiment)

In a second embodiment, a non-magnetic rigid protective film is provided to a cantilever in which a carbon nanofiber probe (a CNF probe) or a carbon nanotube probe (a CNT probe) is formed at the tip of a silicon probe.

Figure 3:
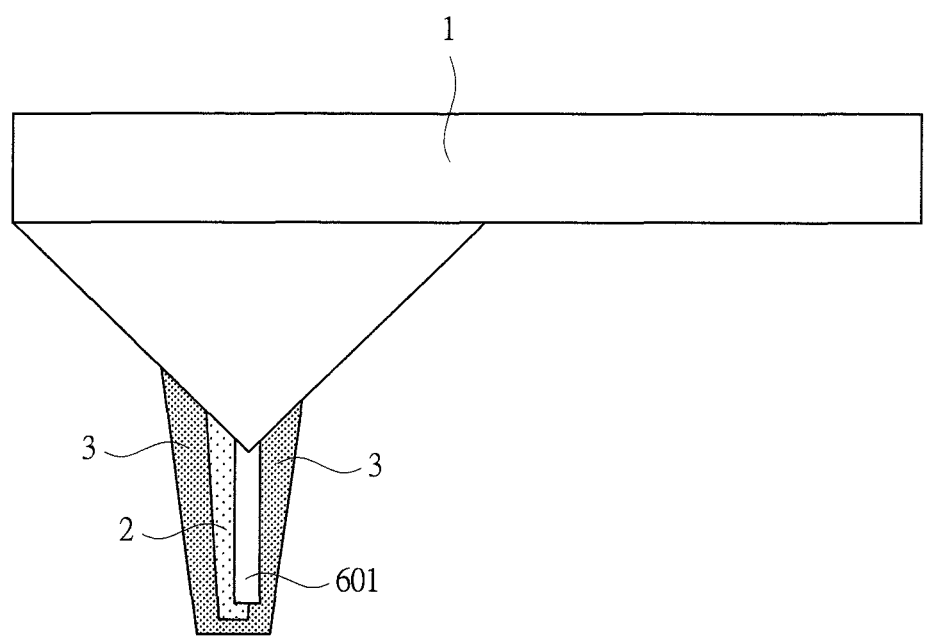
FIG. 3 is a structural diagram showing structure of a cantilever for a magnetic force microscope according to a second embodiment of the present invention.

The structure of a cantilever for the magnetic force microscope according to the second embodiment is described based on FIG. 3. FIG. 3 is a structural diagram showing the structure of the cantilever 1 for the magnetic force microscope according to second embodiment of the present invention.

In FIG. 3, the cantilever 1 for the magnetic force microscope includes a probe 601 composed of a carbon nanofiber probe (a CNF probe) or a carbon nanotube probe (a CNT probe) at the tip of the silicon probe, the magnetic film 2 provided at the front of this probe 601, and the non-magnetic rigid protective film 3 provided at the front and back of the probe provided with the magnetic film 2. In this manner, the cantilever 1 for the magnetic force microscope with high durability is configured.

The functions of each part of the cantilever 1 for the magnetic force microscope are similar to those in the first embodiment.

Figure 4A:
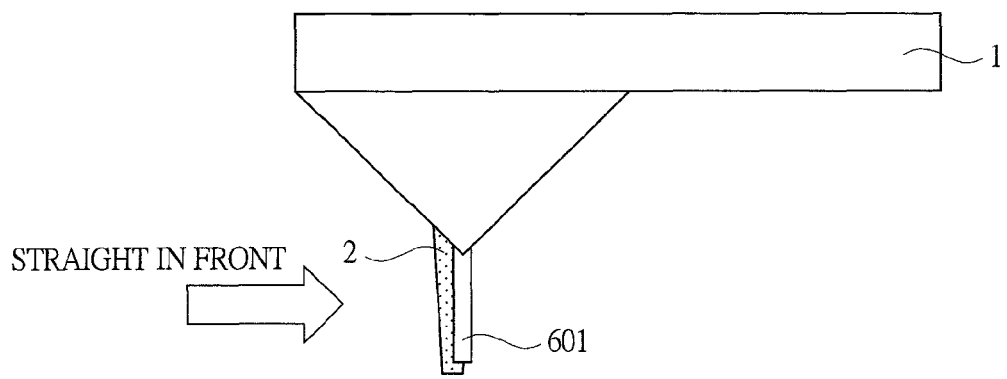
FIG. 4A is a diagram showing a method of manufacturing the cantilever for the magnetic force microscope according to the second embodiment of the present invention.
Figure 4B:
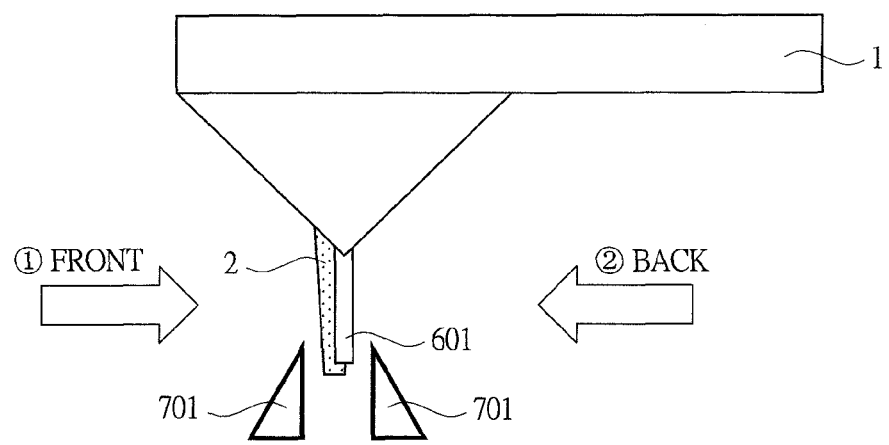
FIG. 4B is a diagram showing the method of manufacturing the cantilever for the magnetic force microscope according to the second embodiment of the present invention.
Figure 4C:
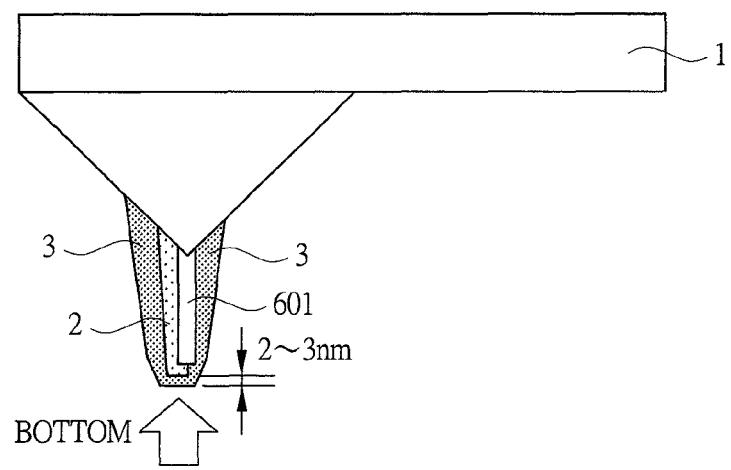
FIG. 4C is a diagram showing the method of manufacturing the cantilever for the magnetic force microscope according to the second embodiment of the present invention.

Next, a method of manufacturing the cantilever for the magnetic force microscope according to the second embodiment of the present invention is described with reference to FIGS. 4A to 4C. FIGS. 4A to 4C are diagrams showing the method of manufacturing the cantilever for the magnetic force microscope according to the second embodiment of the present invention.

First, coating with the magnetic film 2 is performed from straight in front of the cantilever 1 for the magnetic force microscope with the probe 601 (FIG. 4A). Since the probe 601 is a stick-shaped substance having a length of 200 nm or more and a diameter of 10 to 30 nm, upon coating with the magnetic film 2, selection of a sputter device is one point. To suppress the turning-around, it is preferable that the distance between the target and the cantilever is relatively long.

Furthermore, the non-magnetic rigid protective film 3 is provided to the probe 601. The non-magnetic rigid protective film 3 is provided at no angle in two directions, that is, front and back, for coating (FIG. 4B). To form the non-magnetic rigid protective film 3, the entire probe 601 is protected by the film turning around the probe, and it is therefore preferable that the distance between the film formation target and the sample is relatively short so that the non-magnetic rigid protective film 3 can be provided to the entire circumference of the probe in a vertical direction.

On the other hand, in order to suppress the thickness of the non-magnetic rigid protective film at the tip part of the probe to 2 to 3 nm, a shielding 701 is placed about 20 nm away from the front of the tip part of the probe not to make a portion of the non-magnetic rigid protective film 3 at the tip of the probe. When a required film thickness is achieved, the shielding 701 is removed, and a non-magnetic rigid protective film of 2 to 3 nm is further formed from the bottom (FIG. 4C).

By manufacturing the cantilever 1 for the magnetic force microscope in this manner, the cantilever 1 for the magnetic force microscope provided with the non-magnetic rigid protective film 3 can be easily manufactured.

(Third Embodiment)

In a third embodiment, the application of the non-magnetic rigid protective film 3 of the second embodiment is performed while the cantilever 1 for the magnetic force microscope is being rotated. The structure of the cantilever 1 for the magnetic force microscope is similar to that of the second embodiment.

Figure 5A:
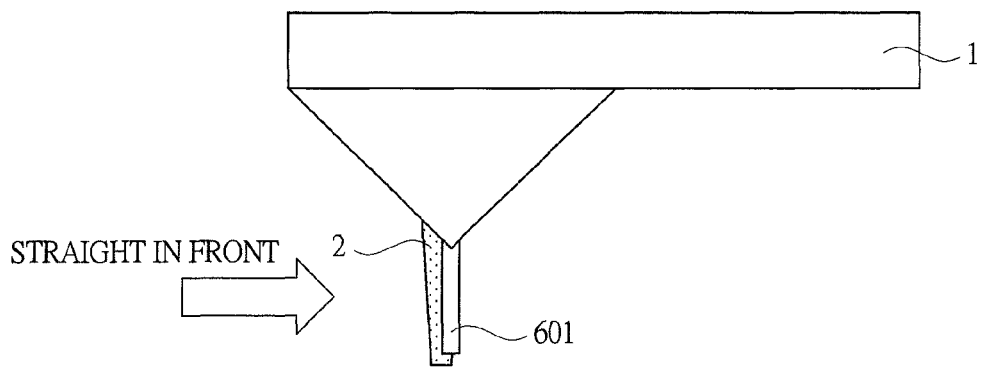
FIG. 5A is a structural diagram showing structure of a cantilever for a magnetic force microscope according to a third embodiment of the present invention.
Figure 5B:
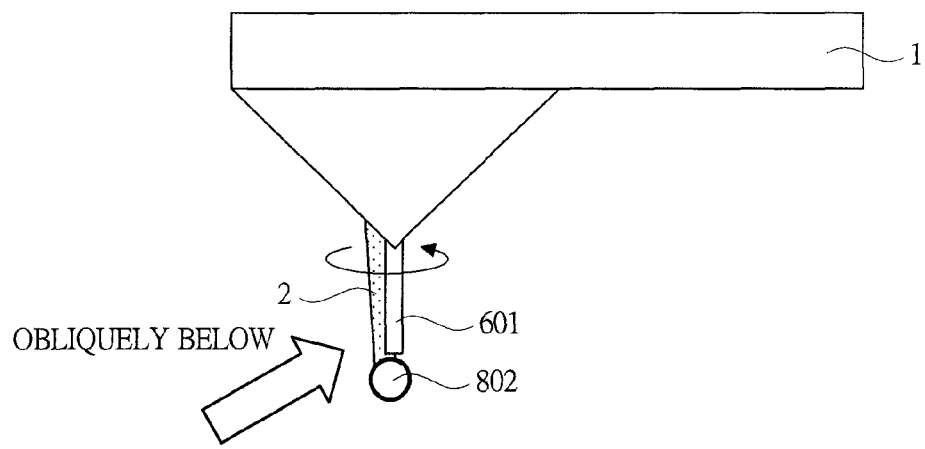
FIG. 5B is a structural diagram showing the structure of the cantilever for a magnetic force microscope according to a third embodiment of the present invention.
Figure 5C:
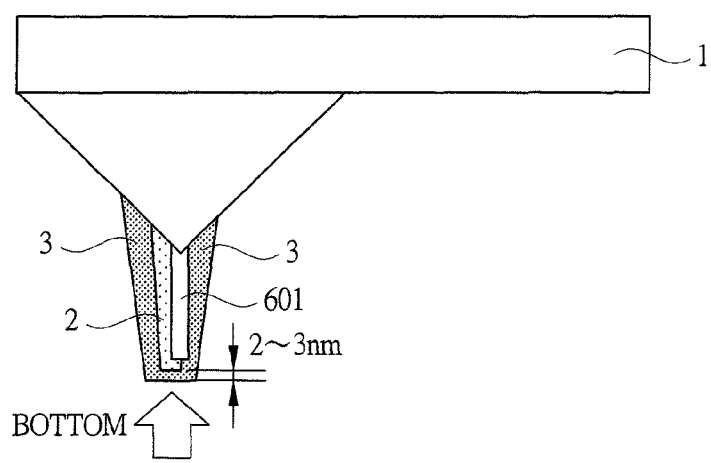
FIG. 5C is a structural diagram showing the structure of the cantilever for a magnetic force microscope according to a third embodiment of the present invention.
Figure 6:
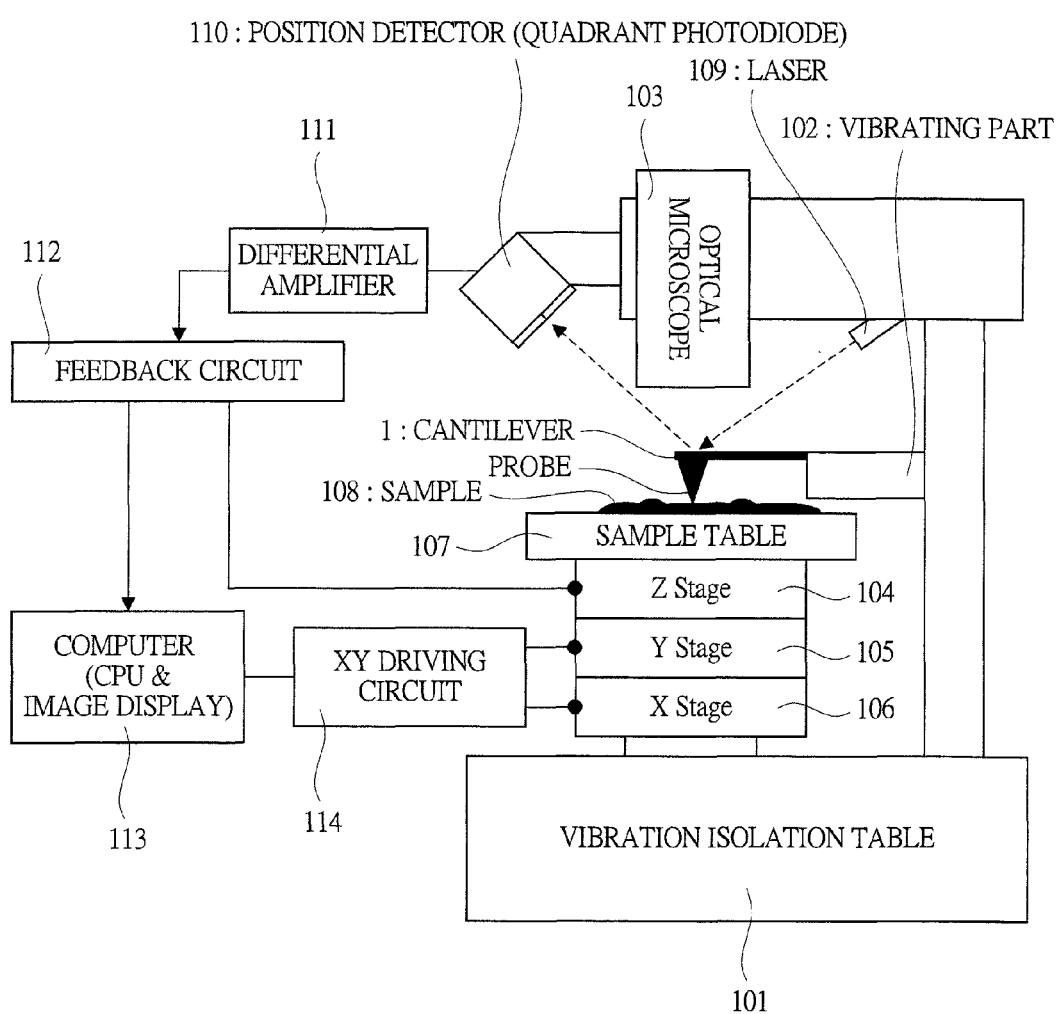
FIG. 6 is an explanatory diagram for describing an example of structure of an atomic force microscope (AFM)
Figure 7:
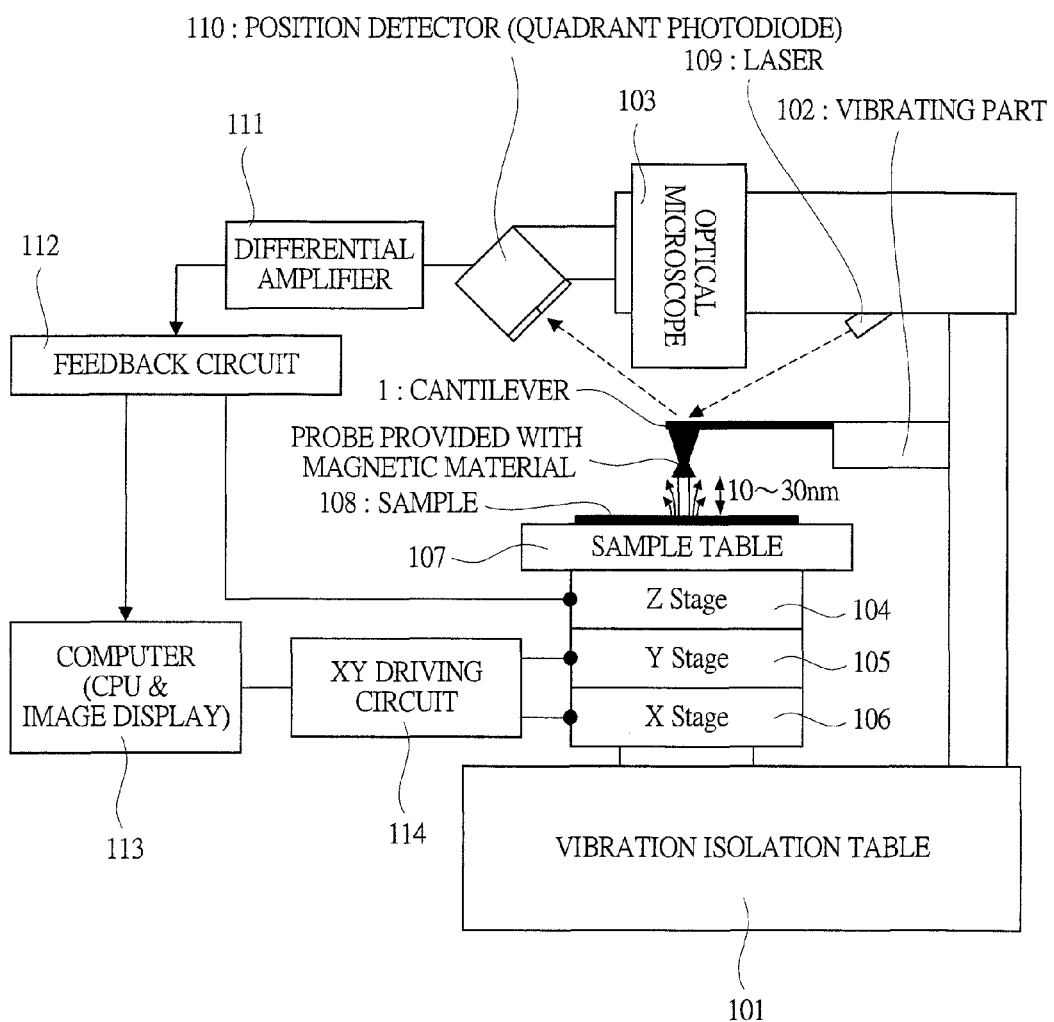
FIG. 7 is an explanatory diagram for describing an example of structure of a magnetic force microscope (MFM)
Figure 8:
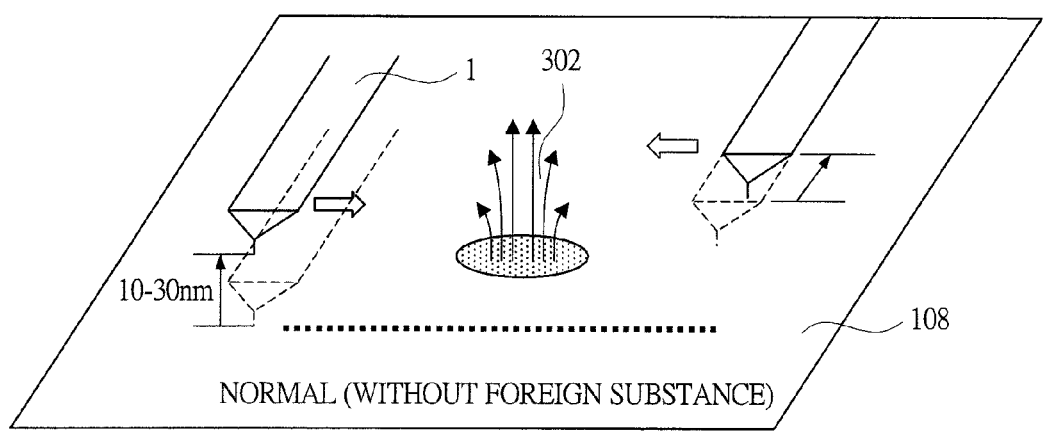
FIG. 8 is an explanatory diagram for describing an influence of a foreign substance when the magnetic force microscope (MFM) is used for measurement.
Figure 8:
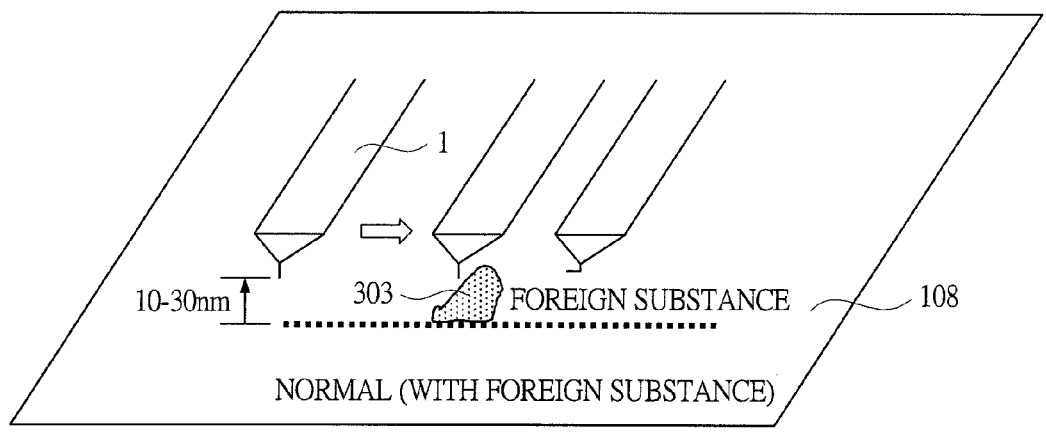

Next, a method of manufacturing the cantilever for the magnetic force microscope according to the third embodiment of the present invention is described with reference to FIGS. 5A to 5C. FIGS. 5A to 5C are diagrams showing the method of manufacturing the cantilever for the magnetic force microscope according to the third embodiment of the present invention.

First, coating with a magnetic film is performed from straight in front of the cantilever 1 for the magnetic force microscope having the probe 601 (FIG. 5A).

Without applying the non-magnetic rigid protective film 3 immediately thereafter, a fine particle 802 (having a diameter of 10 to 40 nm) slightly larger than or substantially equal to the diameter of the tip of the probe 601 is attached to the tip in advance, and then the cantilever 1 for the magnetic force microscope is rotated about the probe being taken as an axis and a non-magnetic rigid protective film 3 is formed obliquely from a probe side of the cantilever 1 (FIG. 5B).

When the thickness of the non-magnetic rigid protective film 3 reaches a required film thickness, the fine particle 802 is removed, and then a non-magnetic rigid protective film of 2 to 3 nm is further formed from the bottom (FIG. 5C).

By manufacturing the cantilever 1 for the magnetic force microscope in this manner, the cantilever 1 for the magnetic force microscope applied with the non-magnetic rigid protective film 3 can be easily manufactured.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be widely applied to cantilevers for use in magnetic force microscopes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A cantilever for a magnetic force microscope to be used in measurement by a magnetic force microscope, the cantilever comprising:
    a magnetic film applied to a probe at a tip of the cantilever for the magnetic force microscope; and
    a non-magnetic rigid protective film applied around the probe,
    wherein the magnetic film is applied to one side of the probe.

2. The cantilever for the magnetic force microscope according to claim 1, wherein
    a spatial resolution when a magnetic field is measured by the cantilever for the magnetic force microscope is determined based on a shape of the magnetic film and formed of material that is prone to oxidation.

3. The cantilever for the magnetic force microscope according to claim 1, wherein
    the magnetic film is formed of a soft magnetic material of Ni, NiFe, or CoFe or a hard magnetic material of Co, Al-Ni-C, or Fe-Pt.

4. The cantilever for the magnetic force microscope according to claim 1, wherein
    the non-magnetic rigid protective film is a film of DLC, TiN, TiC, TiCN, CrNCN, or noble-metal.

5. A cantilever for a magnetic force microscope to be used in measurement by a magnetic force microscope, the cantilever comprising:
    a magnetic film provided to a probe at a tip of the cantilever for the magnetic force microscope; and
    an anti-oxidant protective film for a soft magnetic substance applied around the probe,
    wherein the magnetic film is applied to one side of the probe.

6. A method of manufacturing a cantilever for a magnetic force microscope to be used in measurement by a magnetic force microscope, the method comprising the steps of:
    forming a magnetic film on a probe at a tip of the cantilever for the magnetic force microscope; and
    forming a non-magnetic rigid protective film around the probe,
    wherein,
    when the non-magnetic rigid protective film is formed around the probe of the cantilever for the magnetic force microscope, the non-magnetic rigid protective film is formed from the front of the probe of the cantilever for the magnetic force microscope at an angle (15° to 45°) and from the back of the probe of the cantilever for the magnetic force microscope in two directions each at an angle in a range of (15° to 30°).

7. A method of manufacturing a cantilever for a magnetic force microscope to be used in measurement by the magnetic force microscope, wherein
    a probe at a tip of the cantilever for the magnetic force microscope is a CNF probe or a CNT probe, and,
    when a magnetic film is formed on the CNF probe or the CNT probe, a distance between a film-forming target of the magnetic film and the CNF probe or the CNT probe is long, and, when a non-magnetic rigid protective film is formed around the CNF probe or the CNT probe, a distance between a film-forming target of the non-magnetic rigid protective film and the CNF probe or the CNT probe is short.

8. The method of manufacturing the cantilever for the magnetic force microscope according to claim 7, wherein,
    when the non-magnetic rigid protective film is formed around the CNF probe or the CNT probe, a shielding is placed at a tip part of the CNF probe or the CNT probe for a certain period.

9. The method of manufacturing the cantilever for the magnetic force microscope according to claim 7, wherein,
    when the non-magnetic rigid protective film is formed around the CNF probe or the CNT probe, a fine particle slightly larger than or substantially equal to a diameter of a tip part of the CNF probe or the CNT probe is attached to the tip part before the non-magnetic rigid protective film is formed, the cantilever for the magnetic force microscope is then rotated about the CNF probe or the CNT probe being taken as an axis and the non-magnetic rigid protective film is formed obliquely from below, the fine particle is removed, and then the non-magnetic rigid protective film is further formed from the bottom.

10. A method of manufacturing a cantilever for a magnetic force microscope to be used in measurement by a magnetic force microscope, the method comprising the steps of:

forming a magnetic film on a probe at a tip of the cantilever for the magnetic force microscope; and forming an anti-oxidant protective film for a soft magnetic substance around the probe, wherein the magnetic film is applied to one side of the probe.

11. A method of manufacturing a cantilever for a magnetic force microscope to be used in measurement by a magnetic force microscope, the method comprising the steps of:

forming a magnetic film on a probe at a tip of the cantilever for the magnetic force microscope;

forming a non-magnetic rigid protective film around the probe; and applying the magnetic film to one side of the probe.

* * * * *